(12) United States Patent
Imaizumi

(10) Patent No.: US 9,571,020 B2
(45) Date of Patent: Feb. 14, 2017

(54) MOTOR DRIVE CONTROL DEVICE, MOTOR DRIVE CONTROL METHOD, AND NON-TRANSITORY COMPUTER-READABLE MEDIUM

(71) Applicant: Yuki Imaizumi, Kanagawa (JP)

(72) Inventor: Yuki Imaizumi, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/851,658

(22) Filed: Sep. 11, 2015

(65) Prior Publication Data
US 2016/0079897 A1    Mar. 17, 2016

(30) Foreign Application Priority Data

Sep. 17, 2014  (JP) ................. 2014-189230

(51) Int. Cl.
  *G05B 19/29* (2006.01)
  *H02P 8/24* (2006.01)
  *H04N 1/00* (2006.01)
(52) U.S. Cl.
  CPC ............ *H02P 8/24* (2013.01); *H04N 1/00599* (2013.01); *H04N 1/00652* (2013.01); *H04N 1/00798* (2013.01); *H04N 2201/0094* (2013.01)
(58) Field of Classification Search
  USPC .............. 318/603, 696, 400.39, 54, 65, 799, 58,318/61, 64, 90, 91, 739, 280, 284, 286, 369,318/101, 102, 103, 264, 182, 275, 277; 101/222, 223, 230, 257
  See application file for complete search history.

(56) References Cited

U.S. PATENT DOCUMENTS

| 2004/0124797 | A1* | 7/2004 | Takeuchi .................. H02P 3/00 318/466 |
| 2004/0156654 | A1* | 8/2004 | Nishizaki ........... G03G 15/0178 399/167 |
| 2009/0066988 | A1 | 3/2009 | Imaizumi |
| 2010/0183351 | A1* | 7/2010 | Uji ..................... G03G 15/6567 399/400 |
| 2012/0288288 | A1 | 11/2012 | Imaizumi |

(Continued)

FOREIGN PATENT DOCUMENTS

| JP | 2006-296095 | 10/2006 |
| JP | 2006296095 A | * 10/2006 |

(Continued)

*Primary Examiner* — Jorge L Carrasquillo
(74) *Attorney, Agent, or Firm* — Harness, Dickey & Pierce, P.L.C.

(57) ABSTRACT

A motor drive control device includes: a deceleration start position calculating unit that calculates a deceleration start position indicating an address at which a pulse period is stored, the pulse period being equal to or larger than a pulse period at the time of forced stopping and closest to the pulse period at the time of forced stopping among the pulse periods included in a driving information; a stop pulse number calculating unit that calculates the number of pulses required for stopping the motor at an exciting position; and a driving control unit that outputs a total number of pulses of a counted number of pulses and the number of pulses from the deceleration start position until the motor is stopped in forcibly stopping the motor, and outputs a shortage of the number of pulses required for stopping the motor calculated by the stop pulse number calculating unit.

17 Claims, 16 Drawing Sheets

(56) References Cited

U.S. PATENT DOCUMENTS

2012/0291299 A1* 11/2012 Kudo .................. G01B 5/02
                                                         33/772
2013/0166935 A1    6/2013  Imaizumi
2014/0136009 A1    5/2014  Imaizumi

FOREIGN PATENT DOCUMENTS

| JP | 2010-220108    |   | 9/2010  |
|----|----------------|---|---------|
| JP | 2010220108  A  | * | 9/2010  |
| JP | 2010-283545    |   | 12/2010 |
| JP | 2010283545  A  | * | 12/2010 |

* cited by examiner

FIG.4A

ACCELERATION TABLE

| ADDRESS | PULSE PERIOD |
|---|---|
| 0x0000 | 0x0800 |
| 0x0001 | 0x07C0 |
| 0x0002 | 0x0780 |
| 0x0003 | 0x0740 |
| 0x0004 | 0x0700 |
| 0x0005 | 0x06C0 |
| 0x0006 | 0x0680 |
| 0x0007 | 0x0640 |
| 0x0008 | 0x0600 |
| 0x0009 | 0x05C0 |
| 0x000A | 0x0580 |
| 0x000B | 0x0540 |
| 0x000C | 0x0500 |
| 0x000D | 0x04C0 |
| 0x000E | 0x0480 |
| 0x000F | 0x0440 |
| 0x0010 | 0x0400 |
| 0x0011 | 0x03C0 |
| 0x0012 | 0x0380 |
| 0x0013 | 0x0340 |
| 0x0014 | 0x0300 |
| 0x0015 | 0x02C0 |
| 0x0016 | 0x0280 |
| 0x0017 | 0x0240 |
| 0x0018 | 0x0200 |
| 0x0019 | 0x01C0 |
| 0x001A | 0x0180 |
| 0x001B | 0x0140 |
| 0x001C | 0x0100 |
| 0x001D | 0x00C0 |
| 0x001E | 0x0080 |
| 0x001F | 0x0040 |
| 0x0020 | 0x0020 |

FIG.4B

CONSTANT-SPEED PULSE

| NUMBER OF PULSES | PULSE PERIOD |
|---|---|
| 0x0080 | 0x0030 |

FIG.4C
DECELERATION TABLE

| ADDRESS | PULSE PERIOD |
|---|---|
| 0x0000 | 0x0040 |
| 0x0001 | 0x0080 |
| 0x0002 | 0x00C0 |
| 0x0003 | 0x0100 |
| 0x0004 | 0x0140 |
| 0x0005 | 0x0180 |
| 0x0006 | 0x01C0 |
| 0x0007 | 0x0200 |
| 0x0008 | 0x0240 |
| 0x0009 | 0x0280 |
| 0x000A | 0x02C0 |
| 0x000B | 0x0300 |
| 0x000C | 0x0340 |
| 0x000D | 0x0380 |
| 0x000E | 0x03C0 |
| 0x000F | 0x0400 |
| 0x0010 | 0x0440 |
| 0x0011 | 0x0480 |
| 0x0012 | 0x04C0 |
| 0x0013 | 0x0500 |
| 0x0014 | 0x0540 |
| 0x0015 | 0x0580 |
| 0x0016 | 0x05C0 |
| 0x0017 | 0x0600 |
| 0x0018 | 0x0640 |
| 0x0019 | 0x0680 |
| 0x001A | 0x06C0 |
| 0x001B | 0x0700 |
| 0x001C | 0x0740 |
| 0x001D | 0x0780 |
| 0x001E | 0x07C0 |
| 0x001F | 0x0800 |
| 0x0020 | 0xFFFF |

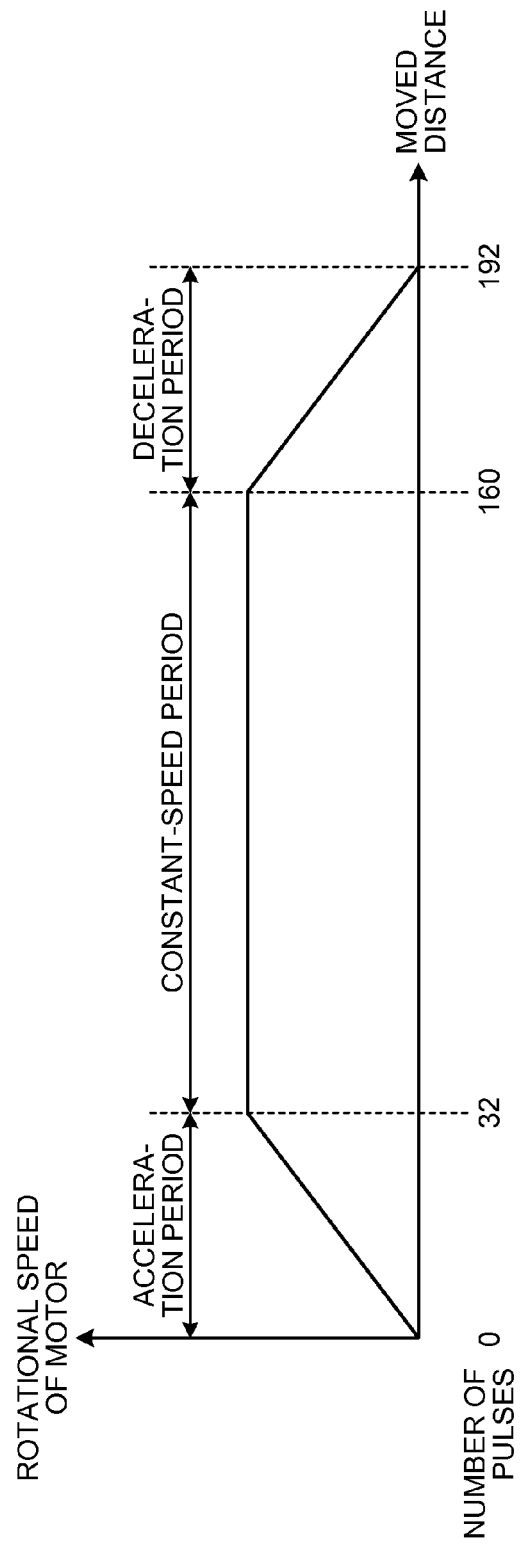

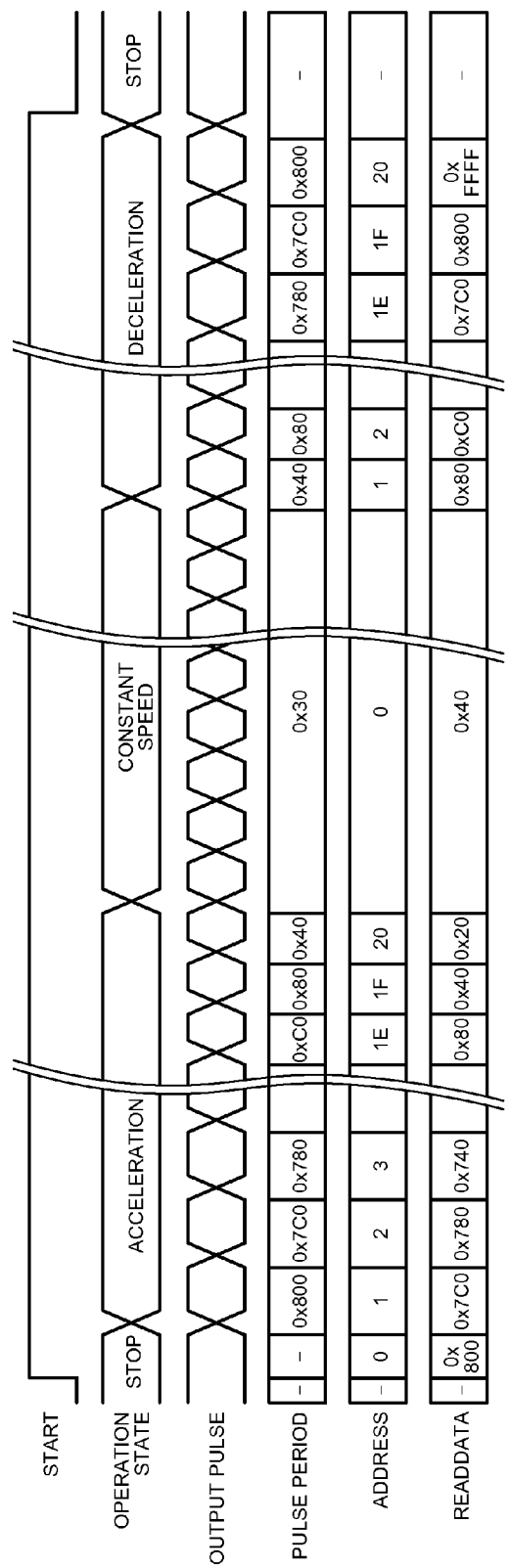

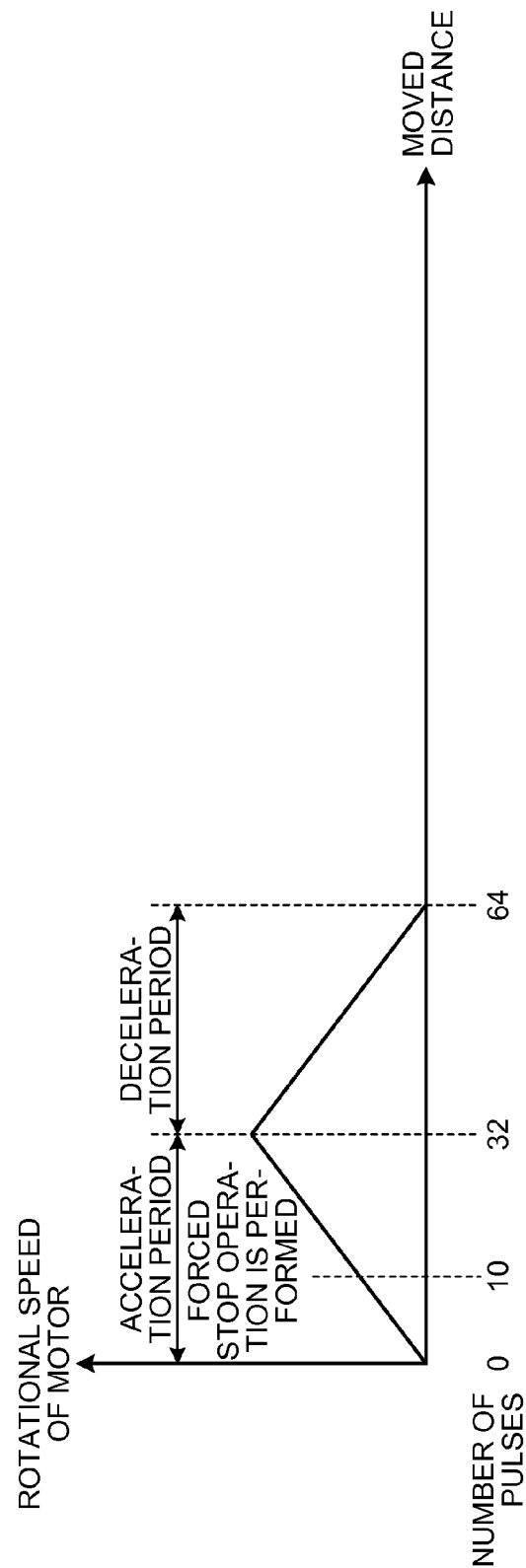

MOTOR DRIVE CONTROL DEVICE, MOTOR DRIVE CONTROL METHOD, AND NON-TRANSITORY COMPUTER-READABLE MEDIUM

CROSS-REFERENCE TO RELATED APPLICATIONS

The present application claims priority to and incorporates by reference the entire contents of Japanese Patent Application No. 2014-189230 filed in Japan on Sep. 17, 2014.

BACKGROUND OF THE INVENTION

1. Field of the Invention

The present invention relates to a motor drive control device, a motor drive control method, and a non-transitory computer-readable medium.

2. Description of the Related Art

In the related art, a stepping motor has been used for conveying a document or controlling movement of a reading optical system in a multifunction peripheral. Basically, to control driving of the stepping motor, a motor is started to be driven at a drive frequency not to cause a loss of synchronization, accelerated to a target speed, decelerated again within a range in which a loss of synchronization is not caused, and stopped. A loss of synchronization of the motor is likely to be caused as a difference between a current pulse period and the next pulse period increases, so that a value set in an acceleration/deceleration table needs to be set within a range in which a loss of synchronization is not caused. When the target speed is a speed that does not cause a loss of synchronization, acceleration and deceleration are not required.

A period setting in an acceleration/deceleration region for preventing a loss of synchronization is stored as a table in a region such as a static RAM (SRAM), and a total number of pulses thereof is set as the number of pulses corresponding to an exciting mode (the number is uniquely determined such as a multiple of 8 in a case of a W1-2-phase). Due to this, known is a technique for reducing a CPU load in driving the motor and stopping the motor at an exciting position corresponding to the exciting mode by successively reading values without a central processing unit (CPU).

For example, disclosed is a technique for setting the acceleration/deceleration table in the SRAM and the like in advance, and controlling acceleration and deceleration of motor driving while the CPU checks free space of an image accumulating memory (refer to Japanese Patent Application Laid-open No. 2010-220108).

Japanese Patent Application Laid-open No. 2006-296095 discloses a technique for calculating acceleration from read acceleration data, and sequentially reading out deceleration data to stop a motor operation in the case that an anomaly occurs in acceleration, for the purpose of forcibly stopping motor driving when an anomaly occurs in the acceleration data.

However, in the motor driving control in the related art described above, to forcibly stop the motor during acceleration for some reasons, transition needs to be made to deceleration control after acceleration control is completed for preventing a loss of synchronization. Due to this control, the motor driving cannot be stopped at a forced stop position, and a minimum number of drive pulses becomes constant from the time when the motor is started to be driven until the motor is stopped.

When the motor driving is stopped at the forced stop position without performing a deceleration operation, the motor is stopped irrespective of the exciting position thereof although a loss of synchronization is not caused, so that a driving torque is not enough in re-driving and a load on the motor itself due to quick stop is heavy.

According to Japanese Patent Application Laid-open No. 2010-220108, when a stop command is received during acceleration, a loss of synchronization of the motor is caused in transition from an acceleration state to a deceleration state depending on timing of receiving the stop command. According to Japanese Patent Application Laid-open No. 2006-296095, the motor cannot stop at the exciting position when the motor is stopped.

Therefore, it is desirable to provide a motor drive control device, a motor drive control method, and a non-transitory computer-readable medium capable of stopping motor driving at the exciting position without causing a loss of synchronization, and stopping the motor driving at a minimum number of pulses from the forced stop position in stopping the motor driving during acceleration.

SUMMARY OF THE INVENTION

It is an object of the present invention to at least partially solve the problems in the conventional technology.

According to an aspect of the present invention, there is provided a motor drive control device including: a counter that counts number of pulses for driving a motor; a memory that stores driving information including pulse periods for driving the motor to be accelerated, to be at a constant speed, and to be decelerated; a deceleration start position calculator that calculates a deceleration start position indicating an address at which a pulse period is stored, the pulse period being equal to or larger than a pulse period at a time of forced stopping and closest to the pulse period at the time of forced stopping among the pulse periods included in the driving information; a stop pulse number calculator that calculates number of pulses required for stopping the motor at an exciting position of the motor in stopping the motor; and a driving controller that outputs a total number of pulses of the counted number of pulses and number of pulses from the deceleration start position until the motor is stopped to stop a deceleration operation in forcibly stopping the motor, and outputs a shortage of the number of pulses required for stopping the motor calculated by the stop pulse number calculator.

According to another aspect of the present invention, there is provided a motor drive control method including: counting number of pulses for driving a motor; storing, in a memory, driving information including pulse periods for driving the motor to be accelerated, to be at a constant speed, and to be decelerated; calculating a deceleration start position indicating an address at which a pulse period is stored, the pulse period being equal to or larger than a pulse period at a time of forced stopping and closest to the pulse period at the time of forced stopping among the pulse periods included in the driving information; calculating number of pulses required for stopping the motor at an exciting position of the motor in stopping the motor; and controlling drive by outputting a total number of pulses of the counted number of pulses and number of pulses from the deceleration start position until the motor is stopped to stop a deceleration operation in forcibly stopping the motor, and outputting a shortage of the number of pulses required for stopping the motor calculated at the calculating the number of pulses required for stopping the motor.

According to still another aspect of the present invention, there is provided a non-transitory computer-readable medium including computer readable program codes, performed by a processor, the program codes when executed causing the processor to execute: counting number of pulses for driving a motor; storing, in a memory unit, driving information including pulse periods for driving the motor to be accelerated, to be at a constant speed, and to be decelerated; calculating a deceleration start position indicating an address at which a pulse period is stored, the pulse period being equal to or larger than a pulse period at a time of forced stopping and closest to the pulse period at the time of forced stopping among the pulse periods included in the driving information; calculating number of pulses required for stopping the motor at an exciting position of the motor in stopping the motor; and controlling drive by outputting a total number of pulses of the counted number of pulses and number of pulses from the deceleration start position until the motor is stopped to stop a deceleration operation in forcibly stopping the motor, and outputting a shortage of the number of pulses required for stopping the motor calculated at the calculating the number of pulses required for stopping the motor.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4A is a table illustrating a setting example of an acceleration table in a storage unit;

FIG. 4B is a table illustrating a setting example of a constant-speed pulse in the storage unit;

FIG. 4C is a table illustrating a setting example of a deceleration table in the storage unit;

FIG. 5 is a graph illustrating a relation between movement and a rotational speed of a stepping motor in a normal operation;

FIG. 6 is a timing chart illustrating the normal operation in FIG. 5;

FIG. 7 is a graph illustrating a relation between the movement and the rotational speed of the stepping motor in a forced stop operation in the related art;

DETAILED DESCRIPTION OF THE PREFERRED EMBODIMENTS

The following describes an embodiment of a motor drive control device, a motor drive control method, and a computer program according to the present invention in detail with reference to the attached drawings.

Embodiment

A motor drive control device according to the embodiment stops motor driving at an ideal motor stop position without causing a loss of synchronization of the motor in forcibly stopping motor control in an acceleration state. The embodiment will be described in detail with reference to the drawings.

Figure 1:
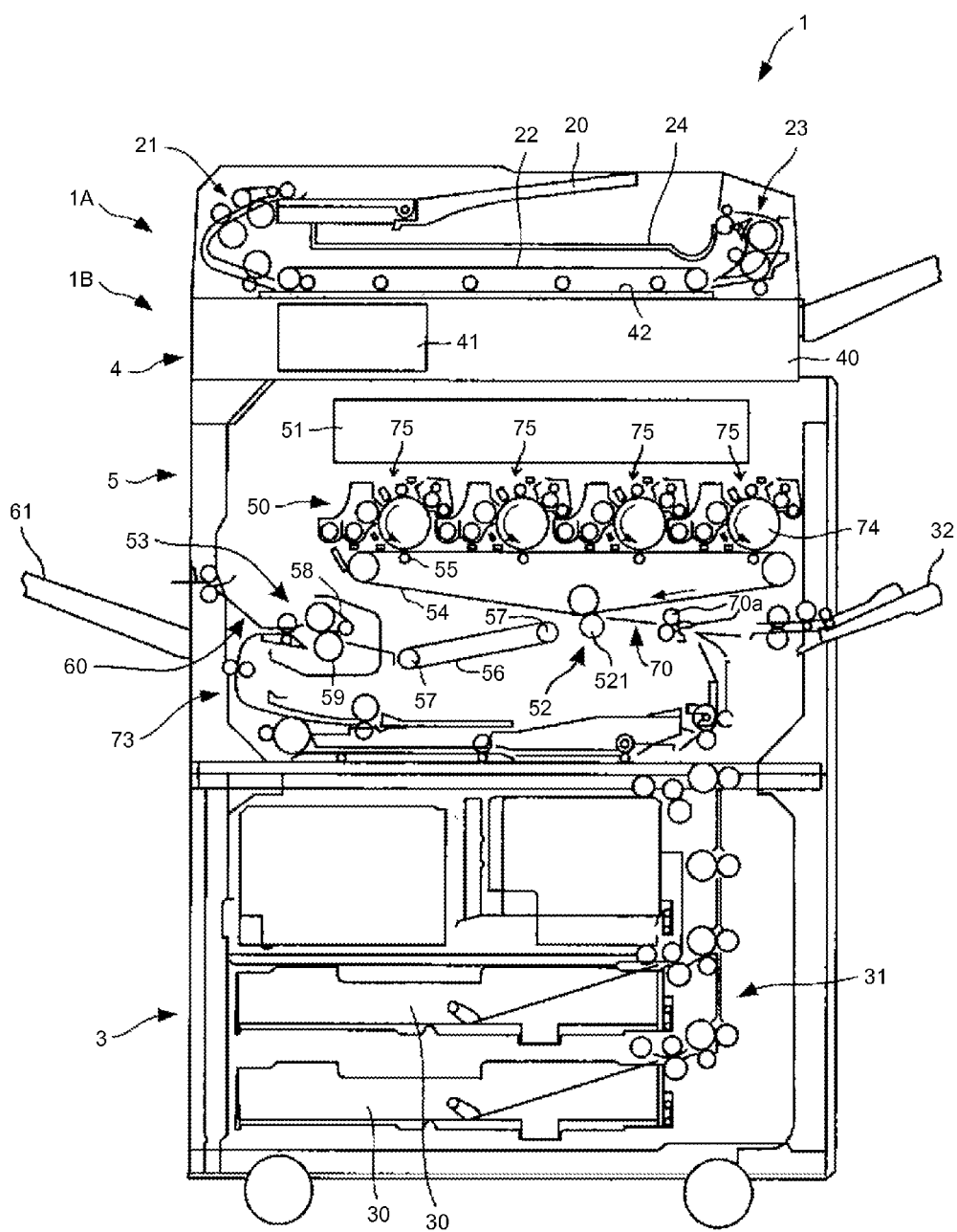
FIG. 1 is a schematic configuration diagram of an image forming apparatus according to an embodiment.

First, the following describes an example of an image forming apparatus on which the motor drive control device according to the embodiment is mounted. FIG. 1 is a schematic configuration diagram of an image forming apparatus 1 according to the embodiment. As illustrated in FIG. 1, the image forming apparatus 1 includes an auto document feeder (ADF) 1A and an apparatus main body 1B. The apparatus main body 1B includes a sheet feeding unit 3, an image reading unit 4, and an image forming unit 5.

The ADF 1A is configured to include a document tray 20, a document feeding roller 21, a document conveying belt 22, a document ejection roller 23, and a document ejection tray 24. The ADF 1A is attached to the image reading unit 4 in an openable manner via an opening and closing mechanism such as a hinge (not illustrated).

The document feeding roller 21 separates a document one by one from a bundle of documents (not illustrated) placed on the document tray 20, and conveys the document toward the image reading unit 4. The document conveying belt 22 conveys the document separated by the document feeding roller 21 to the image reading unit 4. The document ejection roller 23 ejects the document ejected from the image reading unit 4 by the document conveying belt 22 to the document ejection tray 24 below the document tray 20.

The image reading unit 4 is configured to include a housing 40, a scanning optical unit 41, a contact glass 42, and a driving module (not illustrated). The scanning optical unit 41 is disposed inside the housing 40, and includes an LED unit. The scanning optical unit 41 emits light in a main scanning direction from the LED unit, and is driven by the driving module to scan in a sub-scanning direction in the entire irradiation region. In this way, the scanning optical unit 41 reads a two-dimensional color image on the document.

The contact glass 42 is disposed on an upper part of the housing 40 of the image reading unit 4, and constitutes an upper surface of the housing 40. The driving module includes wire (not illustrated) fixed to the scanning optical unit 41, a plurality of driven pulleys (not illustrated) and driving pulleys (not illustrated) bridged across the wire, and a motor that rotates the driving pulleys.

The sheet feeding unit 3 includes a sheet feeding cassette 30 and a sheet feeding module 31. The sheet feeding cassette 30 houses sheets (not illustrated) as recording media having different sheet sizes. The sheet feeding module 31 conveys the sheet housed in the sheet feeding cassette 30 to a main conveyance path 70 of the image forming unit 5.

A manual feed tray 32 is disposed on a side surface of the image forming unit 5 in an openable manner with respect to the image forming unit 5, and a sheet bundle is manually fed on an upper surface of the tray while the manual feed tray 32 is opened with respect to the image forming unit 5. The uppermost sheet in the manually fed sheet bundle is delivered toward the main conveyance path 70 by a delivery roller of the manual feed tray 32.

A pair of registration rollers 70a is disposed in the main conveyance path 70. The pair of registration rollers 70a nips the sheet conveyed through the main conveyance path 70 between the rollers, and delivers the sheet toward a secondary transfer nip at a certain timing.

The image forming unit 5 includes, for example, an exposure unit 51, a tandem image formation unit 50, an intermediate transfer belt 54, an intermediate transfer roller 55, a secondary transferring device 52, and a fixing unit 53. The image forming unit 5 also includes the main conveyance path 70, a reverse conveyance path 73, and a paper ejection path 60.

As illustrated in FIG. 1, the exposure unit 51 is disposed to be adjacent to the tandem image formation unit 50. The exposure unit 51 is configured to perform exposure on a photoconductor drum 74 that is provided corresponding to each of yellow, cyan, magenta, and black.

The tandem image formation unit 50 is configured of four image formation units 75 of yellow, cyan, magenta, and black that are disposed on the intermediate transfer belt 54 along a rotational direction of the intermediate transfer belt 54. Although not illustrated in detail, each of the image formation units 75 includes a charging device, a developing device, a photoconductor cleaning device, a static eliminator, and the like around the photoconductor drum 74 provided corresponding to each of the colors. Each photoconductor drum 74 and respective devices provided therearound are unitized to constitute one process cartridge.

The tandem image formation unit 50 is configured to form a visible image (toner image) formed with toner being classified by colors into each photoconductor drum 74 based on image information that is read by the image reading unit 4 and decomposed into respective colors. The visible image formed on each photoconductor drum 74 is transferred onto the intermediate transfer belt 54 between the photoconductor drum 74 and the intermediate transfer roller 55.

The secondary transferring device 52 is disposed on the opposite side of the tandem image formation unit 50 with the intermediate transfer belt 54 interposed therebetween. The secondary transferring device 52 includes a secondary transfer roller 521 serving as a transfer member. The secondary transfer nip is provided such that the secondary transfer roller 521 is pressed against the intermediate transfer belt 54. The secondary transfer nip is configured such that the toner image formed on the intermediate transfer belt 54 is transferred onto the sheet conveyed from the sheet feeding unit 3 via the main conveyance path 70.

The sheet onto which the toner image is transferred at the secondary transfer nip is delivered to the fixing unit 53 by the sheet conveyance belt 56 spread between two supporting rollers 57.

The fixing unit 53 is configured by pressing a pressure roller 59 onto a fixing belt 58 serving as an endless belt. The fixing unit 53 is configured to apply heat and pressure to the sheet with the pressure roller 59, and melt the toner of the toner image transferred onto the sheet to be fixed onto the sheet as a color image.

The sheet onto which the color image is fixed as described above is stacked on a paper ejection tray 61 outside the apparatus through the paper ejection path 60 serving as a paper ejection conveyance path.

As illustrated in FIG. 1, the reverse conveyance path 73 is disposed below the secondary transferring device 52 and the fixing unit 53. The reverse conveyance path 73 is a path for reversing the front and the back of the sheet ejected from the fixing unit 53 to be supplied again to the secondary transferring device 52 via the main conveyance path 70 to provide images on both sides of the sheet.

A plurality of sheet detecting sensors (not illustrated) serving as paper jam detecting modules are disposed in the main conveyance path 70 and the reverse conveyance path 73 along a conveyance route. The number of sheet detecting sensors and arrangement places are appropriately set. When each sheet detecting sensor does not detect passage of the sheet in a certain time period, the sheet detecting sensor recognizes that a paper jam occurs, and notifies a display unit (not illustrated) and the like of the image forming apparatus 1 that the paper jam occurs.

Motors as follows are mounted on the image forming apparatus 1 configured as described above. For example, provided are motors required to be rotated at a constant speed for appropriately forming an image, such as a motor that drives the photoconductor drums 74, a motor that drives the intermediate transfer belt 54, and a motor that drives the sheet conveyance belt 56. The image forming apparatus 1 includes a motor drive control device for controlling driving of the motors used for image formation to be rotated at a constant speed by feedback control. The following describes a specific example of a motor drive control device 100 included in the image forming apparatus 1 according to the embodiment.

Figure 2:
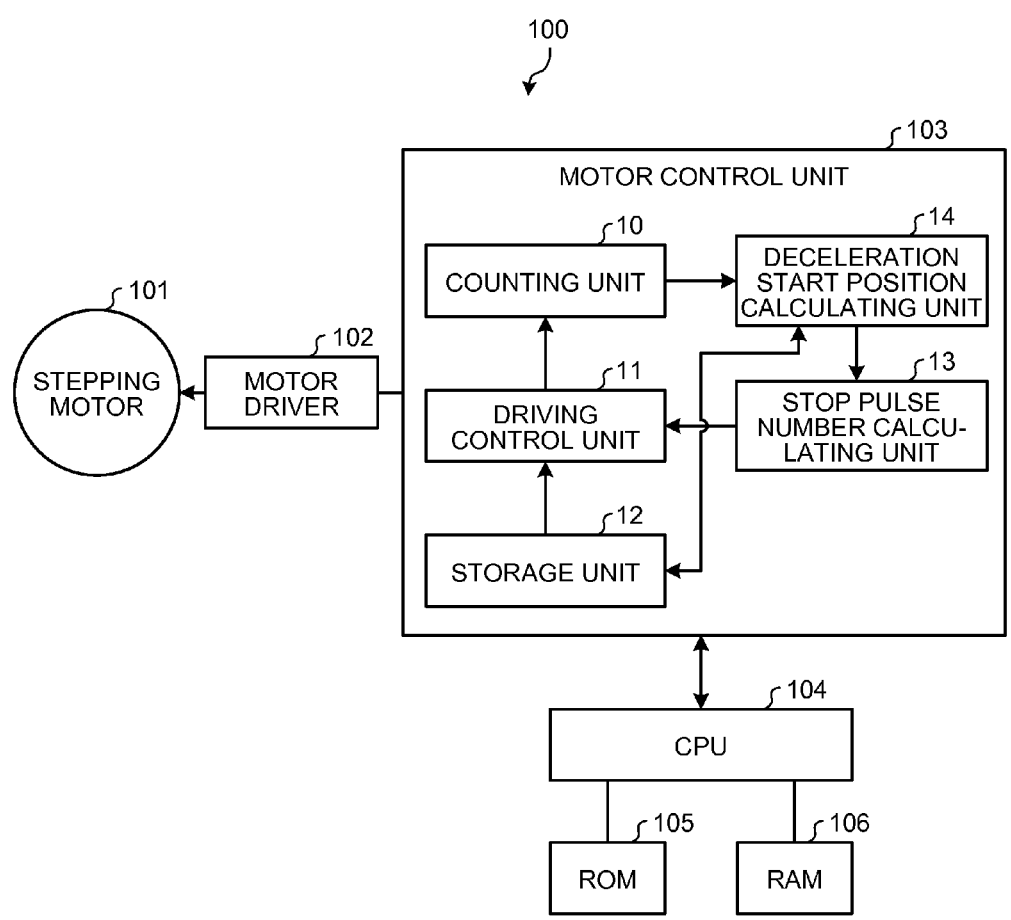
FIG. 2 is a block diagram illustrating a functional configuration of a motor drive control device according to the embodiment.

FIG. 2 is a block diagram illustrating a functional configuration of the motor drive control device 100 according to the embodiment. As illustrated in FIG. 2, the motor drive control device 100 includes a stepping motor 101 as a control object, a motor driver 102, a motor control unit 103, a CPU 104, a ROM 105, and a RAM 106.

Examples of the stepping motor 101 include the photoconductor drums 74, the intermediate transfer belt 54, the sheet conveyance belt 56, or a driving source that drives a carriage and the like of the image reading unit 4 included in the image forming apparatus 1 described above.

The motor driver 102 outputs a driving current for driving the stepping motor 101 based on a control signal from the motor control unit 103.

The motor control unit 103 is a microcomputer system. That is, the motor control unit 103 includes a central processing unit (CPU), a read only memory (ROM), a random access memory (RAM), and the like. The motor control unit 103 controls the stepping motor 101 via the motor driver 102. The motor control unit 103 includes a counting unit 10, a driving control unit 11, a storage unit 12, a stop pulse number calculating unit 13, and a deceleration start position calculating unit 14.

All or part of the functional configuration of the motor control unit 103 described above may be implemented with hardware.

The counting unit 10 counts the number of pulses of the stepping motor 101 output from the driving control unit 11.

The storage unit 12 stores driving information including a pulse period for driving the stepping motor 101 to be accelerated, to be at a constant speed, and to be decelerated. Specifically, as illustrated in FIGS. 4A to 4C described later, the storage unit 12 stores a pulse period of a drive pulse, and an acceleration table and a deceleration table for accelerating or decelerating the stepping motor 101. In setting the acceleration table in the storage unit 12, a reading start position of the deceleration table corresponding to an address of the acceleration table is set in advance. As the storage unit 12, for example, a storage device such as a static RAM (SRAM) is used.

The deceleration start position calculating unit 14 calculates a deceleration start position indicating an address at which a pulse period is stored, the pulse period being equal to or larger than a pulse period at the time of forced stopping and closest to the pulse period at the time of forced stopping among pulse periods included in the driving information of the storage unit 12. That is, to forcibly stop the stepping motor 101, the deceleration start position calculating unit 14 calculates the reading start position (an address to be the deceleration start position) of the deceleration table. The deceleration start position is calculated based on an acceleration pulse period in performing stop processing.

The stop pulse number calculating unit 13 calculates the number of pulses required for stopping the stepping motor 101 at an exciting position thereof. The required number of pulses is calculated from the number of pulses until the motor is stopped and an exciting mode of the stepping motor 101 described later.

When the stepping motor 101 is forcibly stopped, the driving control unit 11 outputs a total number of pulses of the number of pulses counted by the counting unit 10 and the number of pulses from the deceleration start position until the motor is stopped calculated by the deceleration start position calculating unit 14, and stops a deceleration operation. After stopping the deceleration operation, the driving control unit 11 outputs the number of pulses for compensating the number of pulses required for stopping the motor calculated by the stop pulse number calculating unit 13.

The driving control unit 11 generates a pulse for driving the stepping motor 101. Pulse output is started by a startup trigger from the CPU 104, and a preset number of pulses are output, or the pulse output is stopped due to a forced stop command from the CPU 104. A period and a driving pattern of the output drive pulse are determined according to a value read from the storage unit 12. Reading from each table in the storage unit 12 will be appropriately described as "read".

For the acceleration table and the deceleration table, a pulse period is set according to each address. The acceleration table and the deceleration table are read in descending order or in ascending order from a certain table position. When the motor is forcibly stopped, the deceleration table is read from an address of the deceleration start position calculated by the deceleration start position calculating unit 14. When an acceleration operation is performed, the deceleration table position closest to an acceleration period is transferred to the deceleration start position calculating unit 14. The driving pattern is managed separately from the acceleration/deceleration table, and is always read in a determined order. The order of read is determined depending on the exciting mode of the stepping motor 101 to be controlled.

The CPU 104 uses the RAM 106 as a working memory according to a control program of the ROM 105, and performs startup processing of the motor control unit 103, forced stop processing, and setting of the acceleration table and the deceleration table.

Figure 3A:
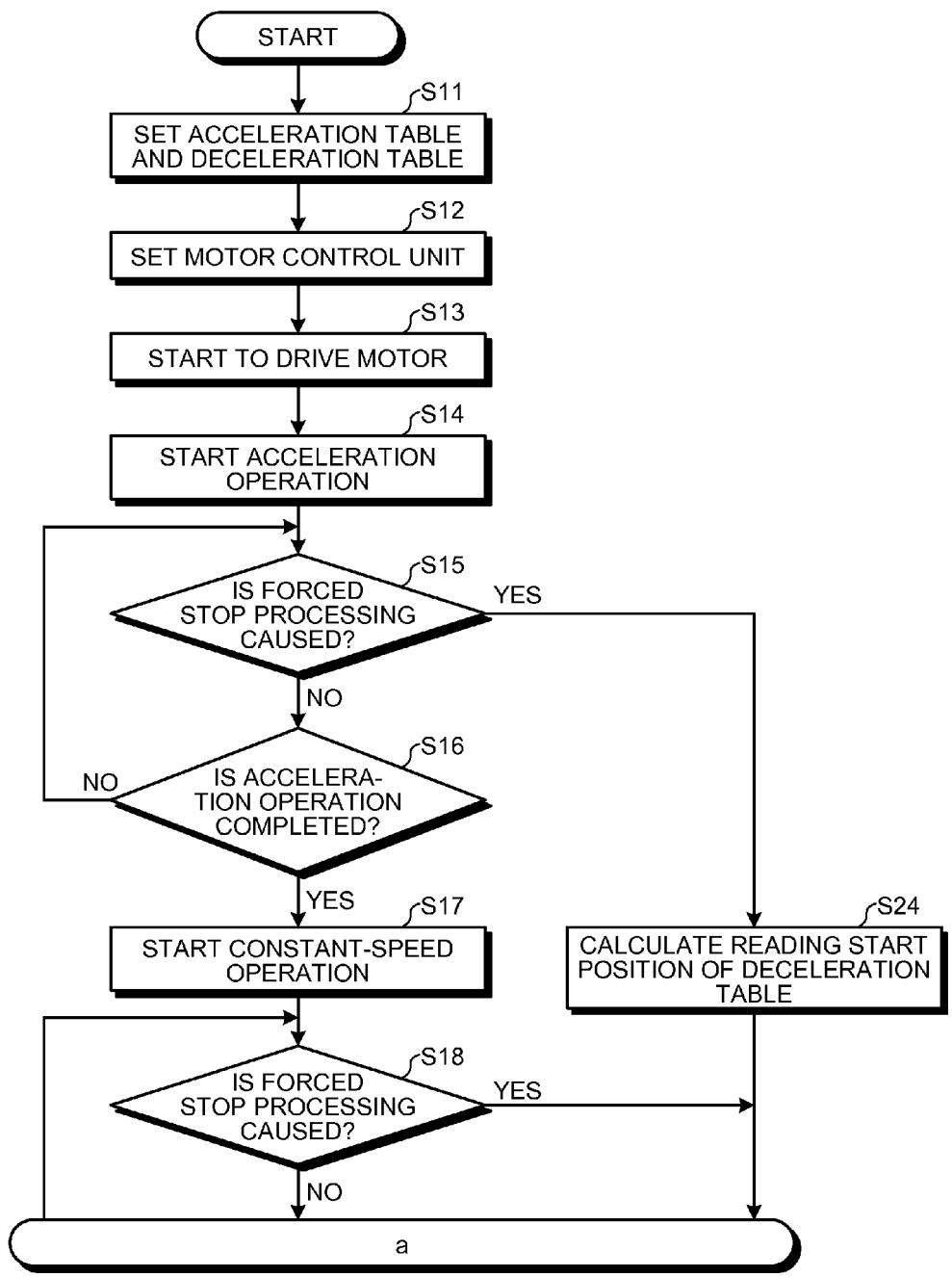
FIG. 3A is a flowchart (1) illustrating an example of a motor control operation performed by the motor drive control device in FIG. 2.
Figure 3B:
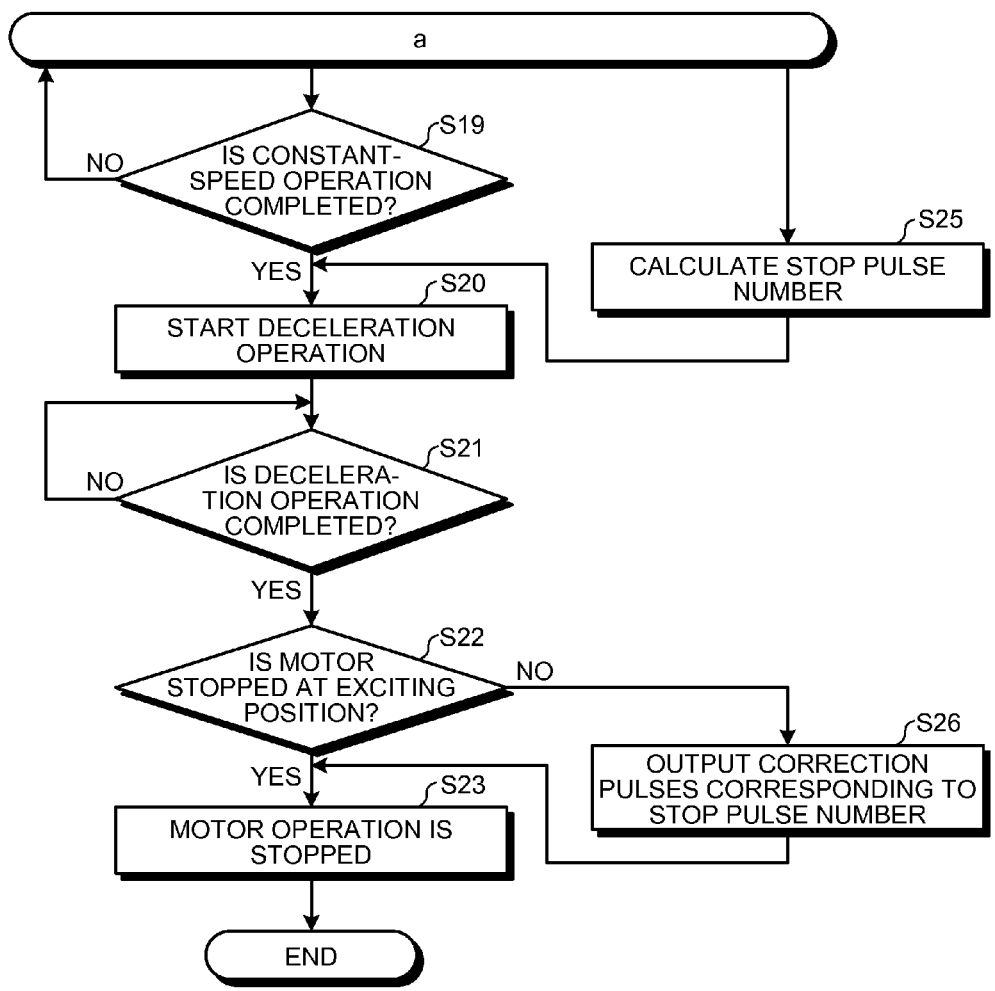
FIG. 3B is a flowchart (2) illustrating an example of the motor control operation performed by the motor drive control device in FIG. 2.

FIGS. 3A and 3B are flowcharts illustrating an example of a motor control operation performed by the motor drive control device 100 in FIG. 2. When this control operation is started, first, the motor control unit 103 sets the acceleration table and the deceleration table of the stepping motor 101 in the storage unit 12 (Step S11). In this case, the acceleration table and the deceleration table are read in ascending order of addresses or in descending order of addresses, so that a value corresponding thereto is set.

Subsequently, settings required for driving various motors are performed (Step S12). Examples of a main setting item include a motor exciting mode, the number of constant-speed pulses, and a constant-speed pulse period. The motor control unit 103 then turns on a motor driving start trigger through the CPU 104 (Step S13). The motor control unit 103 then reads out the pulse period from the acceleration table and successively outputs pulses corresponding to read values to perform acceleration operation of the stepping motor 101 (Step S14).

Subsequently, the driving control unit 11 determines whether to forcibly stop the operation of the stepping motor 101 during acceleration due to any factor (Step S15). If it is determined that the operation of the stepping motor 101 does not cause forced stop processing (No at Step S15), the driving control unit 11 further determines whether the acceleration operation is completed (Step S16). If the acceleration operation is not completed (No at Step S16), the driving control unit 11 continues the acceleration operation until it is completed. On the other hand, if it is determined that the acceleration operation is completed at Step S16 (Yes at Step S16), the driving control unit 11 outputs a pulse of the constant-speed pulse period set in advance, and starts a constant-speed operation (Step S17).

Subsequently, the driving control unit 11 determines whether to forcibly stop the operation during the constant-speed operation similarly to during the acceleration operation (Step S18). If it is determined that the operation of the stepping motor 101 does not cause forced stop processing (No at Step S18), the driving control unit 11 further determines whether the constant-speed operation is completed depending on whether the constant-speed pulse period of the set number of pulses is output (Step S19). If the constant-speed operation is not completed (No at Step S19), the driving control unit 11 continues the constant-speed operation until it is completed. On the other hand, if it is determined that the constant-speed operation is completed at Step S19 (Yes at Step S19), the driving control unit 11 successively reads the pulse period using the deceleration table in the storage unit 12 similarly to during the acceleration operation, and starts deceleration (Step S20).

Subsequently, the driving control unit 11 determines whether the deceleration operation is completed (Step S21). If the deceleration operation is not completed (No at Step S21), the driving control unit 11 repeats this determination. If the deceleration operation is completed (Yes at Step S21), the driving control unit 11 further determines whether the stop position of the stepping motor 101 is the exciting position corresponding to the set exciting mode (Step S22). If it is determined that the stop position is the exciting position (Yes at Step S22), the driving control unit 11 stops driving of the stepping motor 101 (Step S23).

If it is determined that the operation of the stepping motor 101 causes forced stop processing at Step S15 (Yes at Step S15), the driving control unit 11 performs the following control. When the operation is forcibly stopped during acceleration, the driving control unit 11 calculates a pulse period of starting deceleration from the pulse period stored in the acceleration table at the time when the operation is forcibly stopped, and determines the reading start position of the deceleration table (Step S24).

After Step S24 is performed, or if it is determined that the operation of the stepping motor 101 causes the forced stop processing at Step S18 (Yes at Step S18), the driving control unit 11 performs the following operation. That is, the driving control unit 11 calculates a total number of pulses from a count of the number of pulses until the operation is forcibly stopped and the number of pulses from the reading start position of the deceleration table until the operation is stopped, and calculates the number of pulses required for stopping the operation at the stop position corresponding to the exciting mode (Step S25). After Step S25 is performed, the process proceeds to Step S20.

If it is determined that the motor is not stopped at the exciting position at Step S22 (No at Step S22), the driving control unit 11 outputs pulses of the same pulse period as the last stage of deceleration by the calculated number of corrected pulses to rotate the stepping motor 101 to a position corresponding to the exciting mode (Step S26). After Step S26 is performed, the process proceeds to Step S23.

As described above, the stop position of the stepping motor 101 varies depending on the exciting mode. By way of example, a motor behavior needs to be stopped under conditions as follows.

2-phase excitation: a total number of pulses is a multiple of 2

1-2-phase excitation: a total number of pulses is a multiple of 4

W1-2-phase excitation: a total number of pulses is a multiple of 8

As an example of state transition of the stepping motor 101, state transition is assumed to be made under the conditions as follows.

Acceleration state⇒constant-speed state: in the case when the pulse period read from the acceleration table is smaller than the constant-speed pulse period, or when a preset pulse period of the acceleration table is output.

Constant-speed state⇒deceleration state: in the case when a preset constant-speed pulse period is output.

Deceleration state⇒stop state: in the case when a certain value (for example, all bits are 1) is read from the pulse period of the deceleration table, or when a preset pulse period of the deceleration table is output.

Next, the following describes control of the stepping motor 101 in each operation. The operation will be described by exemplifying a case in which the operation is performed under the conditions as follows.

Exciting mode: W1-2-phase excitation
Acceleration table: 32 stages
Number of constant-speed pulses: 128 stages
Deceleration table: 32 stages FIG. 4A illustrates a setting example of the acceleration table in the storage unit 12. FIG. 4B illustrates a setting example of the constant-speed pulse in the storage unit 12. FIG. 4C illustrates a setting example of the deceleration table in the storage unit 12. The tables illustrated in FIGS. 4A to 4C are examples corresponding to the conditions for the stepping motor 101 described above. Each of the tables is read at a timing before a corresponding pulse is output.

First, the following describes an example of normal operations in controlling the stepping motor 101 with reference to FIGS. 5 and 6. FIG. 5 is a graph illustrating a relation between movement and a rotational speed of the stepping motor 101 in the example of the normal operation of the stepping motor 101. FIG. 6 is a timing chart illustrating the example of the normal operation in FIG. 5.

In the normal operation illustrated in FIGS. 5 and 6, reading is started from the address 0x0000 in the acceleration table (refer to FIG. 4A) during acceleration, and at a stage of reading the pulse period stored at the address 0x0020 in the acceleration table, transition is made to the constant-speed state because a condition of "the pulse period of the constant-speed pulse>the pulse period of the acceleration table" is met. In the constant-speed state, 128 pulses the pulses period of which is 0x0030 are output, and transition is made to the deceleration state. Similarly to during acceleration, reading is started from the address 0x0000 in the deceleration table (refer to FIG. 4C) during deceleration, and the operation is stopped at a stage of reading the pulse period 0xFFFF stored at the address 0x0020 in the deceleration table. The pulse period needs to be read before the pulse is output, so that the last pulse period is 0x0800 at a timing when the pulse period 0xFFFF is read.

Figure 8:
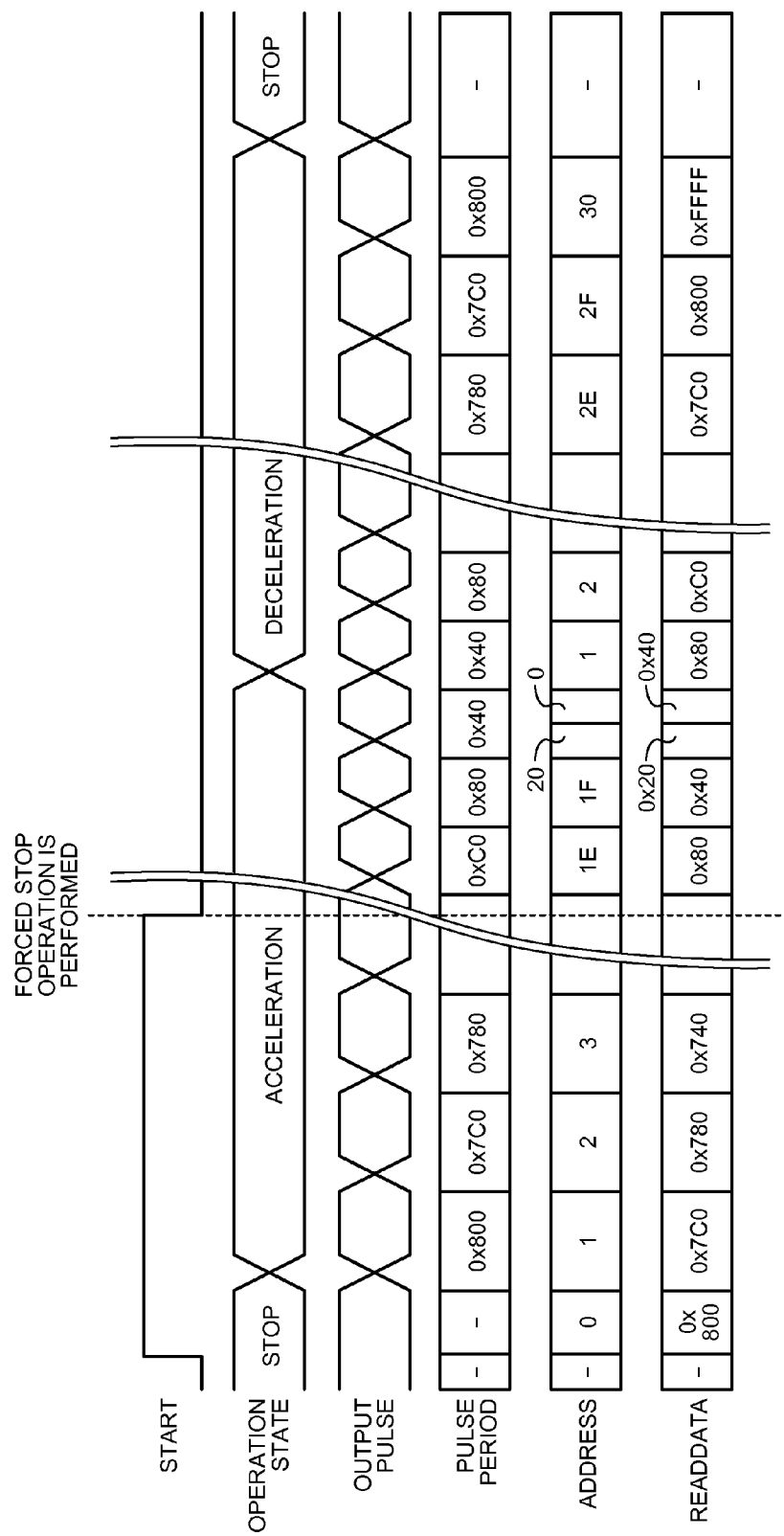
FIG. 8 is a timing chart illustrating the forced stop operation in the related art in FIG. 7.

Next, the following describes an example of the forced stop operation in the related art with reference to FIGS. 7 and 8. FIG. 7 is a graph illustrating a relation between the movement and the rotational speed of the stepping motor 101 in the example of the forced stop operation in the related art. FIG. 8 is a timing chart illustrating the example of the forced stop operation in FIG. 7. The following exemplifies a case in which the motor is stopped after acceleration is completed even when the forced stop operation is performed during acceleration to prevent a loss of synchronization of the stepping motor 101, and the forced stop operation is performed at the 10-th pulse during acceleration.

In the example of the forced stop operation in the related art, acceleration is performed similarly to acceleration during the normal operation, and the forced stop operation is performed at a timing when 10 pulses are output. Additionally, to prevent a loss of synchronization and to stop the motor at the exciting position, deceleration is started after all of 32 acceleration pulses are completely output. Accordingly, even though the forced stop operation is performed at a point when the number of output pulses is 10, a final number of output pulses is 64 in total, that is, 32 pulses of the acceleration table and 32 pulses of the deceleration table. At a timing when the pulse period 0x0020 as a trigger for ending acceleration is read, the first pulse period after deceleration is started is immediately read. This is because the first pulse period after deceleration is started is not correctly output unless the pulse period of deceleration is read during output of the last pulse in acceleration.

Figure 9:
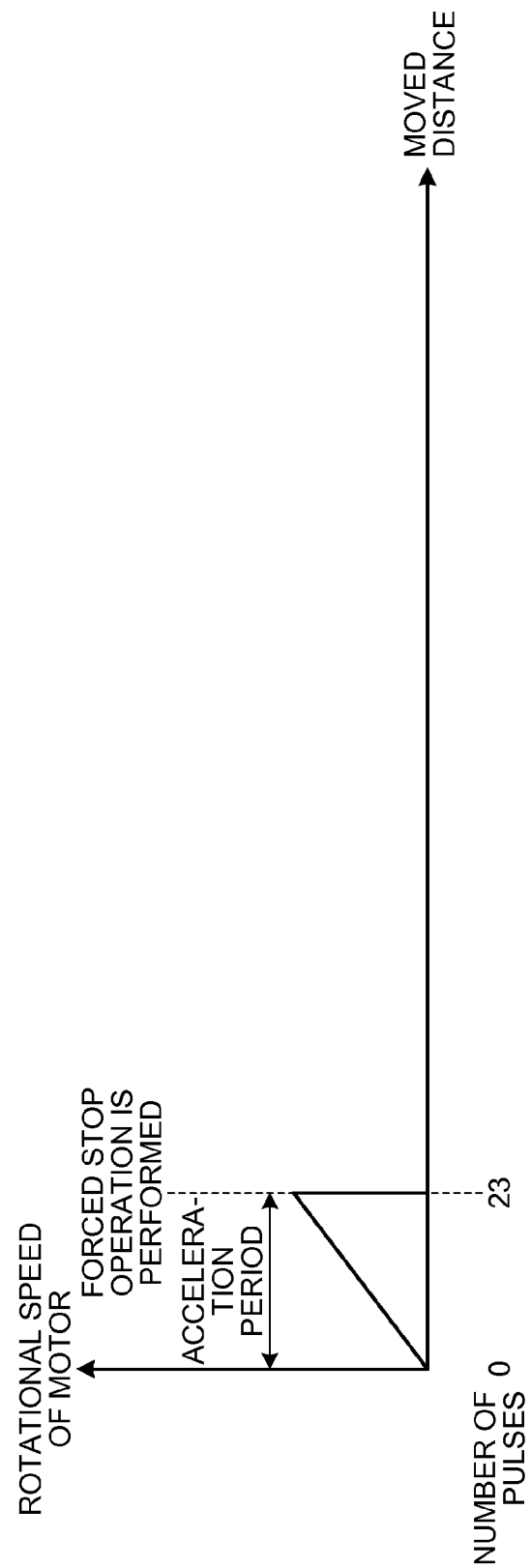
FIG. 9 is a graph illustrating a relation between the movement and the rotational speed of the stepping motor in a case in which a motor behavior is immediately stopped when the forced stop operation is performed.
Figure 10:
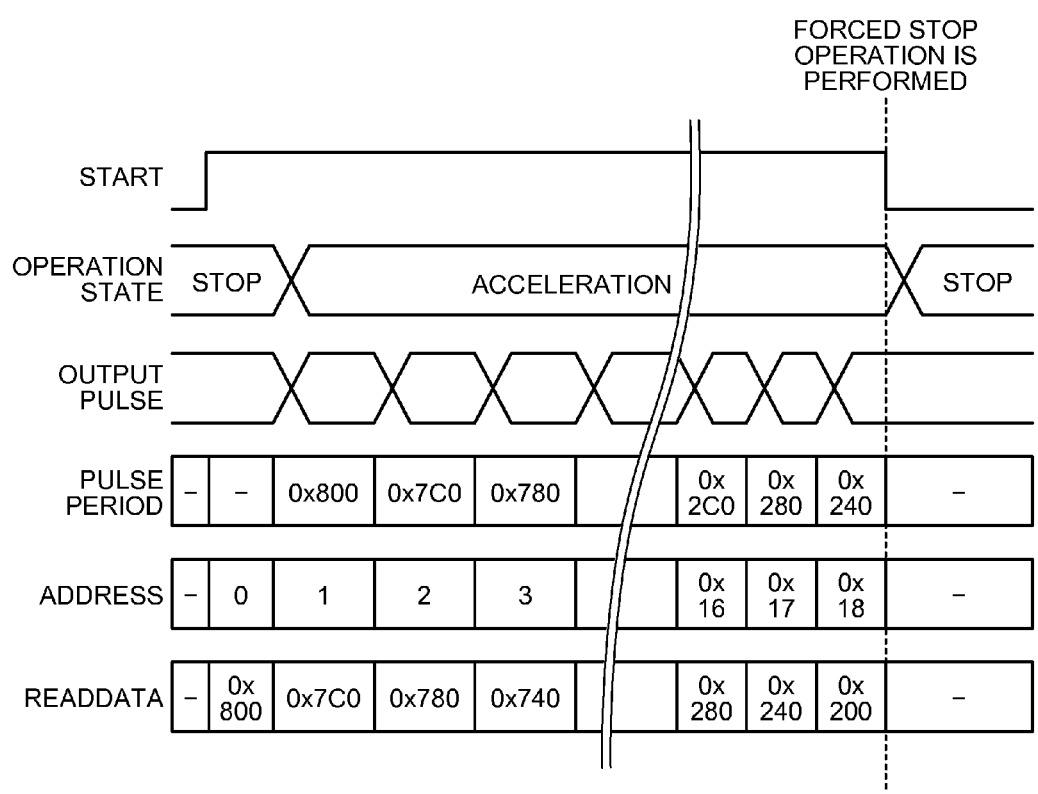
FIG. 10 is a timing chart illustrating a case in which the motor behavior is immediately stopped when the forced stop operation is performed as illustrated in FIG. 9.

Next, the following describes an example of immediately stopping the motor behavior at the time when the forced stop operation is performed with reference to FIGS. 9 and 10. In this example, exemplified is a case in which the forced stop operation is performed at the 23rd pulse during acceleration.

Acceleration is started similarly to the normal operation described above, and the forced stop operation is performed at the 23rd pulse as illustrated in FIG. 9. The driving of the motor is stopped at a timing when the forced stop operation is performed without decelerating the motor to be stopped when the forced stop operation is performed, so that transition is made from the acceleration state to a stop state (refer to FIG. 10). Due to this, depending on the timing when the forced stop operation is performed, the motor cannot be stopped at the exciting position and a load on the stepping motor 101 is heavy.

Figure 11:
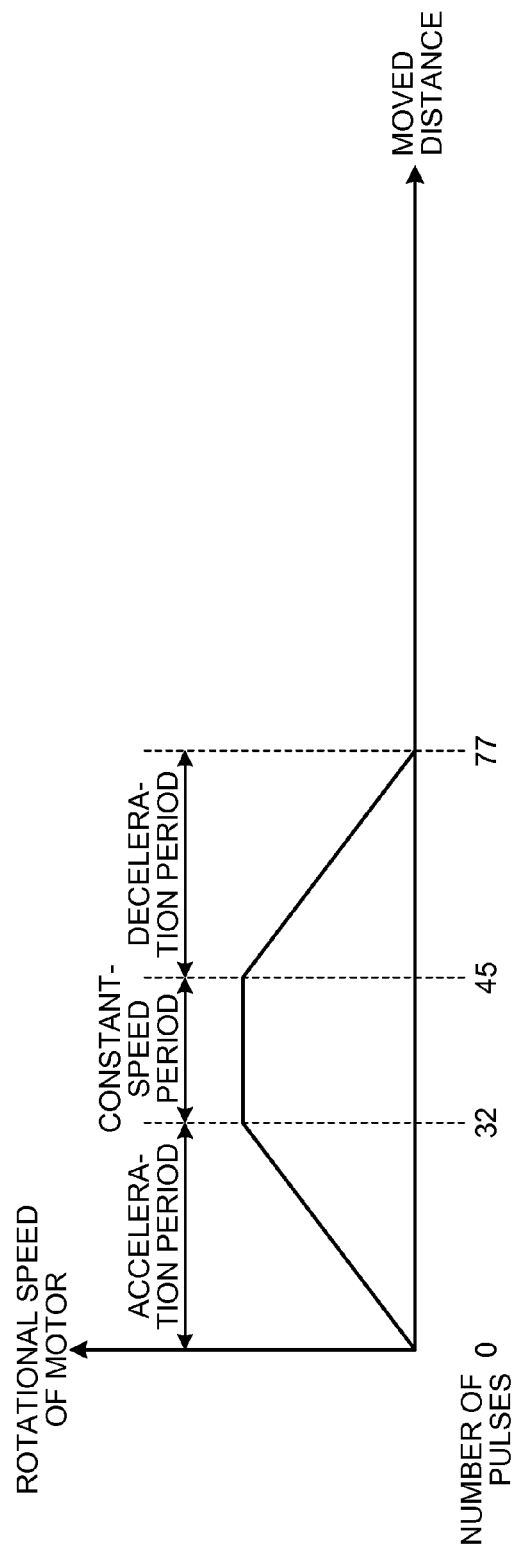
FIG. 11 is a graph illustrating a relation between the movement and the rotational speed of the stepping motor in a case in which the stepping motor is forcibly stopped at the thirteenth pulse in a constant-speed state.

Next, the following describes a case in which the forced stop operation is performed at the 13th pulse during the constant-speed state with reference to FIG. 11. The timing chart of this case is the same as that described above except that the number of pulses in the constant-speed state as a normal state is small, so that the timing chart is not illustrated. In this case, acceleration is started as in the normal operation, and the forced stop operation is performed at the 13-th pulse after transition is made to the constant-speed state. Transition is made to the deceleration state immediately after the forced stop operation is performed, so that 32 acceleration pulses, 13 constant-speed pulses, and 32 deceleration pulses are output. As a result, the number of output pulses until the driving of the motor is stopped becomes 77, so that the motor cannot be stopped at the exciting position (a total number of pulses is a multiple of 8).

In a case of performing the forced stop operation in the deceleration state, behavior of motor control is the same as in the normal state described above even if the forced stop operation is performed in the deceleration state.

Figure 12:
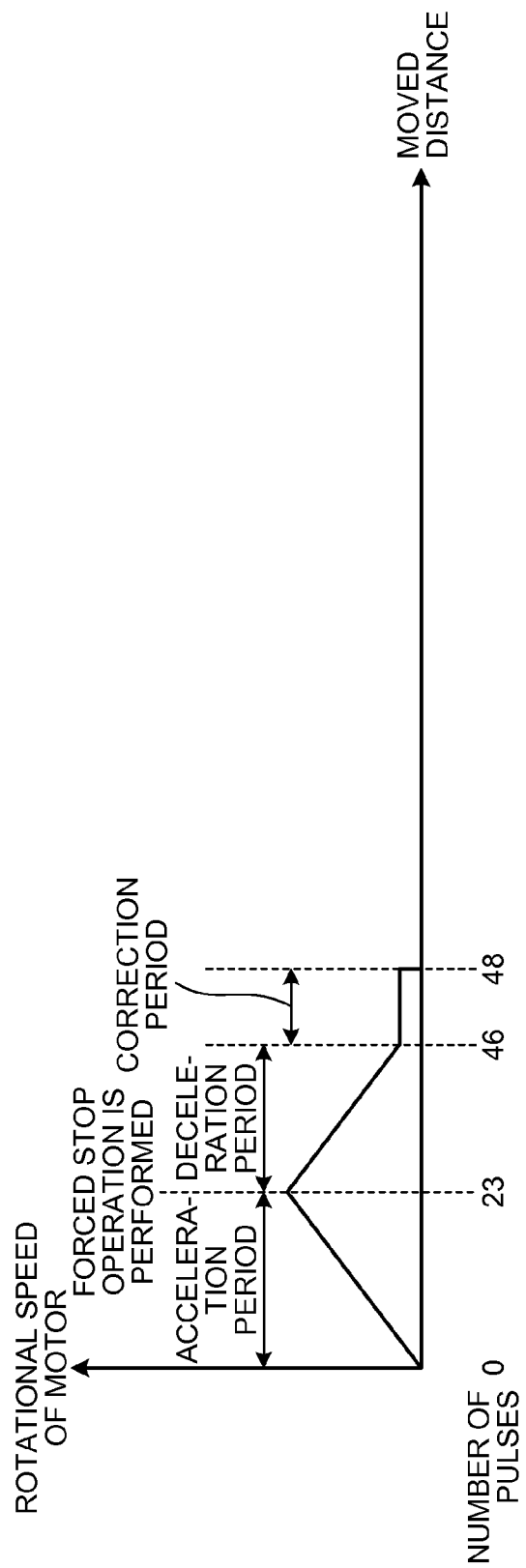
FIG. 12 is a graph illustrating a relation between the movement and the rotational speed of the stepping motor in an example of the forced stop operation according to the present invention.
Figure 13:
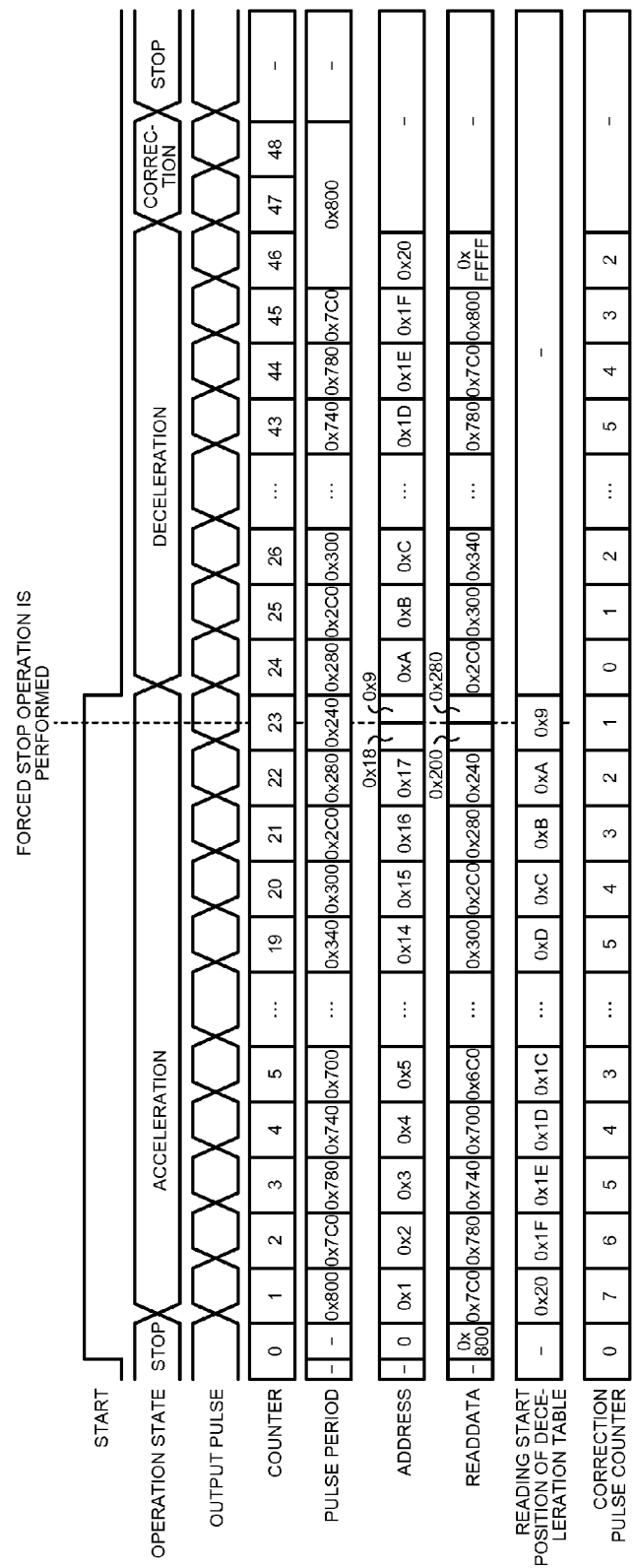
FIG. 13 is a timing chart illustrating the example of the forced stop operation in FIG. 12.

Next, the following describes an example of the forced stop operation according to the present invention with reference to FIGS. 12 and 13. In this example, described is a case in which the forced stop operation is performed at the 23th pulse during acceleration.

First, the counting unit 10 starts to accelerate the driving of the stepping motor 101 similarly to the normal operation described above, and counts the sum total of the output pulses. A multiple for stopping the motor at the exciting position is determined (a multiple of 8 for the W1-2-phase) depending on the exciting mode of the stepping motor 101, so that correction pulses are counted based on a value of a counter of the output pulse. The correction pulses are counted so that a total value of the counter of the output pulse and the correction pulse is a multiple of 8.

The deceleration start position calculating unit 14 calculates the reading start position of the pulse period of the deceleration table corresponding to the acceleration pulse at the same time. The reading start position of the pulse period of the deceleration table is an address at which a pulse period is stored, the pulse period being larger than the currently output pulse period and closest thereto. This address is set in advance in setting the acceleration table (refer to FIG. 4A) in the storage unit 12. The deceleration table (refer to FIG. 4C) may be searched at a timing when the acceleration period is read.

In this way, a period difference is the minimum when transition is made from the acceleration state to the deceleration state, so that a loss of synchronization of the stepping motor 101 is not caused during the state transition.

At a timing when the forced stop operation is performed, the driving control unit 11 reads the first pulse period after deceleration is started from the calculated reading start address of the deceleration table. The driving control unit 11 starts to output the pulse period of the deceleration table at a timing when the pulse period of the acceleration table is completely output, and performs the deceleration operation until a certain pulse period (0xFFFF) is read.

At a timing when the deceleration operation is ended, the driving control unit 11 outputs correction pulses corresponding to a value of a correction pulse counter. At this time, the pulse period is equivalent to a pulse period of the last output in deceleration.

In this way, the driving control unit 11 repeats down-counting from N−1 to 0 at the same timing as the pulse output based on a value of N (N is an integral number) that is uniquely determined depending on the exciting mode of the stepping motor 101. The number of pulses required for stopping the motor at the exciting position is calculated based on the current number of pulses.

The driving control unit 11 counts the output pulses when the motor is started to be driven, and calculates the number of pulses from the reading start position of the deceleration table to the last stage of the deceleration table when a motor drive stop command is given. The driving control unit 11 calculates a total number of pulses required for stopping the motor from the calculated number of pulses and the number of pulses until the stop command for the stepping motor 101 is given, and calculates the number of pulses required for being a multiple of N (N is an integral number) that is uniquely determined depending on the exciting mode of the stepping motor 101.

In a case in which the forced stop operation is performed in the constant-speed state, control in transition to the deceleration state is performed similarly to control in the related art. Correction after the deceleration operation is performed similarly to control in the acceleration state. In a case in which the forced stop operation is performed in the deceleration state, control is performed similarly to the driving control in the related art.

That is, when receiving a motor stop command in the constant-speed state, the driving control unit 11 makes transition to the deceleration operation from the next pulse output after receiving the stop command. When receiving the stop command for the stepping motor 101 in the deceleration state, the driving control unit 11 stops motor driving after the deceleration operation is completed as usual.

The motor drive control device 100 according to the embodiment described above performs control as follows. The motor drive control device 100 sets the acceleration table and the deceleration table for motor driving in the storage unit 12 in advance, and counts, with the counting unit 10, the number of pulses until the forced stop operation is performed. The deceleration start position calculating unit 14 calculates the reading start position of the deceleration table from the pulse period when the forced stop operation is performed, and calculates the number of pulses required for deceleration.

The reading start position of the deceleration table is an address at which the pulse period set to the deceleration table that is equal to or larger than the pulse period at the time of forced stopping and closest thereto is stored. The number of deceleration pulses is the number of pulses from the reading start position until the motor is stopped. The stop pulse number calculating unit 13 calculates a shortage of pulses for stopping the motor at the exciting position from the number of acceleration pulses and the number of deceleration pulses. The driving control unit 11 outputs the pulse of the last pulse period in deceleration corresponding to the shortage after the deceleration operation is completed.

The pulse period calculated as described above at the time when the deceleration operation is started is equal to or larger than the pulse period at the time of forced stopping and closest thereto, so that a difference between the last period in acceleration and the first period in deceleration is small and a loss of synchronization is not caused even when the acceleration state is switched to the deceleration state. Additionally, the number of pulses required for stopping the motor at the exciting position that is determined depending on the exciting mode of the stepping motor 101 is calculated when the deceleration operation is ended, so that the motor can be stopped at the exciting position. Accordingly, when the motor operation is forcibly stopped during acceleration of driving of the stepping motor 101, a loss of synchronization is not caused, the motor driving can be stopped with the minimum number of pulses, and the stop position can be the exciting position of the stepping motor 101.

At a timing of reading the next pulse period of the acceleration table, the driving control unit 11 reads and holds the pulse period of the deceleration table from the reading start position of the deceleration table that is set in the storage unit 12 in advance.

At a timing of receiving a stop command for the stepping motor 101, the driving control unit 11 reads the pulse period of the deceleration table from the reading start position of the deceleration table corresponding to a reading position of the current acceleration table.

The deceleration start position calculating unit 14 reads the pulse period from the deceleration table, and compares the read pulse period with an output value of the pulse period to determine the reading start position of the deceleration table.

At a timing of reading the next pulse period from the acceleration table, the deceleration start position calculating unit 14 sequentially reads a period from the deceleration table. The deceleration start position calculating unit 14 then compares the next pulse period of the acceleration table with the read pulse period of the deceleration table, and at a timing when the pulse period of the acceleration table becomes smaller than the pulse period of the deceleration table, determines the reading start position of the deceleration table at a timing when the next pulse is output.

When a total number of output pulses is currently less than a half of the acceleration table, the deceleration start position calculating unit 14 sequentially reads the pulse period of the deceleration table from the last stage of the deceleration table. At a timing when the read pulse period of the deceleration table is equal to or larger than the pulse period of the acceleration table, the deceleration start position calculating unit 14 determines the reading start position of the deceleration table.

When a total number of output pulses is currently equal to or larger than a half of the acceleration table, the deceleration start position calculating unit 14 sequentially reads the pulse period of the deceleration table from the top of the deceleration table. At a timing when the read pulse period of the deceleration table is larger than the acceleration pulse period, the deceleration start position calculating unit 14 determines the reading start position of the deceleration table.

The computer program executed in the embodiment is provided by being incorporated in the ROM in advance. However, the embodiment is not limited thereto. The computer program executed in the embodiment may be provided as a computer program product by being recorded in a computer-readable recording medium. For example, the computer program may be recorded and provided in a computer-readable recording medium such as a compact disc read only memory (CD-ROM), a flexible disk (FD), a compact disc recordable (CD-R), and a digital versatile disc (DVD), as an installable or executable file.

The computer program executed in the embodiment may be stored in a computer connected to a network such as the Internet and provided by being downloaded via the network. Furthermore, the computer program executed in the embodiment may be provided or distributed via a network such as the Internet.

The computer program executed in the embodiment has a module configuration including functions of the counting unit 10, the driving control unit 11, the storage unit 12, the stop pulse number calculating unit 13, and the deceleration start position calculating unit 14. As actual hardware, a CPU (processor) reads and executes the computer program from the recording medium, and each module is loaded on a main storage device such as the RAM. Each module is then generated on the main storage device.

According to the present embodiments, in stopping the motor driving during acceleration, the motor driving can be stopped at the exciting position without causing a loss of synchronization, and the motor driving can be stopped at a minimum number of pulses from the forced stop position.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A motor drive control device comprising:
   a counter to count a number of pulses for driving a motor;
   a memory to store driving information including a plurality of pulse periods for driving the motor to be accelerated, to be at a constant speed, and to be decelerated;
   a deceleration start position calculator to calculate a deceleration start position indicating an address at which one of the plurality of pulse periods is stored, the one pulse period being equal to or larger than another of the plurality of pulse periods at a time the motor is forcibly stopped and relatively closest to the another pulse period at the time the motor is forcibly stopped;
   a stop pulse number calculator to calculate a number of pulses required to stop the motor at an exciting position of the motor; and
   a driving controller to output a total number of pulses of the counted number of pulses and a number of pulses from a deceleration start position until the motor is stopped to stop a deceleration operation in forcibly stopping the motor, and to output a shortage of the number of pulses required to stop the motor, calculated by the stop pulse number calculator.

2. The motor drive control device according to claim 1, wherein the driving information in the memory includes an acceleration table and a deceleration table, and wherein a reading start position of the deceleration table, corresponding to an address of the acceleration table, is set in advance in setting the acceleration table.

3. The motor drive control device according to claim 1, wherein the driving information in the memory includes a deceleration table, and wherein the driving controller is configured to read and hold a pulse period of the deceleration table from the reading start position of the deceleration table set in the memory in advance, at a timing when a next pulse period of the acceleration table is read.

4. The motor drive control device according to claim 1, wherein the driving information in the memory includes an acceleration table and a deceleration table, and wherein the driving controller is configured to read a pulse period of the deceleration table from the reading start position of the deceleration table corresponding to a current reading position of the acceleration table, at a timing when a stop command for the motor is received.

5. The motor drive control device according to claim 1, wherein the driving information in the memory includes a deceleration table, and wherein the deceleration start position calculator is configured to read a pulse period from the deceleration table, and compare the read pulse period with a value of a pulse period to be output, to determine a reading start position of the deceleration table.

6. The motor drive control device according to claim 1, wherein the driving information in the memory includes an acceleration table and a deceleration table, and wherein the deceleration start position calculator is configured to sequentially read a period from the deceleration table at a timing when a next pulse period is read from the acceleration table, and compare the next pulse period of the acceleration table with the read pulse period of the deceleration table, to determine a reading start position of the deceleration table at a timing when the next pulse is output, at a timing when the pulse period of the acceleration table is smaller than the pulse period of the deceleration table.

7. The motor drive control device according to claim 1, wherein the driving information in the memory includes an acceleration table and a deceleration table, and wherein the deceleration start position calculator is configured to sequentially read a pulse period of the deceleration table from a last stage of the deceleration table when a sum total of current output pulses is less than a half of the acceleration table, to determine the reading start position of the deceleration table at a timing when the read pulse period of the deceleration table is equal to or larger than a pulse period of the acceleration table.

8. The motor drive control device according to claim 1, wherein the driving information in the memory includes an acceleration table and a deceleration table, and wherein the deceleration start position calculator is configured to sequentially read a pulse period of the deceleration table from a top of the deceleration table when a sum total of current pulses is equal to or larger than a half of the acceleration table, to determine the reading start position of the deceleration table at a timing when the read pulse period of the deceleration table is larger than a pulse period of the acceleration table.

9. A motor drive control method comprising:
counting number of pulses for driving a motor;
storing, in a memory, driving information including a plurality of pulse periods for driving the motor to be accelerated, to be at a constant speed, and to be decelerated;
calculating a deceleration start position indicating an address at which one of the plurality of pulse periods is stored, the one pulse period being equal to or larger than another of the plurality of pulse periods at a time of the motor is forcibly stopped and relatively closest to the another pulse period at the time the motor is forcibly stopped;
calculating a number of pulses required to stop the motor at an exciting position of the motor; and
controlling drive of the motor by outputting a total number of pulses of the counted number of pulses and a number of pulses from a deceleration start position until the motor is stopped to stop a deceleration operation in forcibly stopping the motor, and outputting a shortage of the number of pulses required for stopping the motor, determined by the calculating of the number of pulses required to stop the motor.

10. The motor drive control method according to claim 9, wherein the driving information in the memory includes an acceleration table and a deceleration table, and wherein a reading start position of the deceleration table, corresponding to an address of the acceleration table, is set in advance in setting the acceleration table.

11. The motor drive control method according to claim 9, wherein the driving information in the memory includes a deceleration table, and wherein a pulse period of the deceleration table is read and held from the reading start position of the deceleration table set in the memory in advance, at a timing when a next pulse period of the acceleration table is read.

12. The motor drive control method according to claim 9, wherein the driving information in the memory includes an acceleration table and a deceleration table, and wherein a pulse period of the deceleration table is read and held from the reading start position of the deceleration table corresponding to a current reading position of the acceleration table, at a timing when a stop command for the motor is received.

13. The motor drive control method according to claim 9, wherein the driving information in the memory includes a deceleration table, and wherein the a pulse period is read from the deceleration table, and the read pulse period is compared with a value of a pulse period to be output, to determine a reading start position of the deceleration table.

14. The motor drive control method according to claim 9, wherein the driving information in the memory includes an acceleration table and a deceleration table, and wherein a period is sequentially read from the deceleration table at a timing when a next pulse period is read from the acceleration table, and the next pulse period of the acceleration table is compared with the read pulse period of the deceleration table, to determine a reading start position of the deceleration table at a timing when the next pulse is output at a timing when the pulse period of the acceleration table is smaller than the pulse period of the deceleration table.

15. The motor drive control method according to claim 9, wherein the driving information in the memory includes an acceleration table and a deceleration table, and wherein a pulse period of the deceleration table is sequentially read from a last stage of the deceleration table when a sum total of current output pulses is less than a half of the acceleration table, to determine the reading start position of the deceleration table at a timing when the read pulse period of the deceleration table is equal to or larger than a pulse period of the acceleration table.

16. The motor drive control method according to claim 9, wherein the driving information in the memory includes an acceleration table and a deceleration table, and wherein a pulse period of the deceleration table is sequentially read from a top of the deceleration table when a sum total of current pulses is equal to or larger than a half of the acceleration table, to determine the reading start position of the deceleration table at a timing when the read pulse period of the deceleration table is larger than a pulse period of the acceleration table.

17. A non-transitory computer-readable medium comprising computer readable program codes, performed by a processor, the program codes when executed causing the processor to execute:
counting number of pulses for driving a motor;
storing, in a memory, driving information including a plurality of pulse periods for driving the motor to be accelerated, to be at a constant speed, and to be decelerated;
calculating a deceleration start position indicating an address at which one of the plurality of pulse periods is stored, the one pulse period being equal to or larger than another of the plurality of pulse periods at a time of the motor is forcibly stopped and relatively closest to the another pulse period at the time the motor is forcibly stopped;

calculating a number of pulses required to stop the motor at an exciting position of the motor; and controlling drive of the motor by outputting a total number of pulses of the counted number of pulses and a number of pulses from a deceleration start position until the motor is stopped to stop a deceleration operation in forcibly stopping the motor, and outputting a shortage of the number of pulses required for stopping the motor, determined by the calculating of the number of pulses required to stop the motor.

* * * * *